United States Patent
Lee et al.

(10) Patent No.: US 10,027,782 B2
(45) Date of Patent: Jul. 17, 2018

(54) LINK ADAPTATION FOR 802.11 SYSTEM

(71) Applicant: NEWRACOM, Inc., Irvine, CA (US)

(72) Inventors: Daewon Lee, Laguna Niguel, CA (US); Sungho Moon, San Jose, CA (US); Yujin Noh, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/283,780

(22) Filed: Oct. 3, 2016

(65) Prior Publication Data

US 2017/0099219 A1    Apr. 6, 2017

Related U.S. Application Data

(60) Provisional application No. 62/236,802, filed on Oct. 2, 2015, provisional application No. 62/252,353, filed on Nov. 6, 2015.

(51) Int. Cl.
| | |
|---|---|
| *H04L 12/28* | (2006.01) |
| *H04L 29/06* | (2006.01) |
| *H04W 28/02* | (2009.01) |
| *H04L 12/811* | (2013.01) |
| *H04W 84/12* | (2009.01) |

(52) U.S. Cl.
CPC .............. *H04L 69/22* (2013.01); *H04L 47/38* (2013.01); *H04W 28/02* (2013.01); *H04W 84/12* (2013.01)

(58) Field of Classification Search
CPC ..... H04L 45/74; H04L 61/6022; H04L 69/22; H04W 84/12
USPC ......................................................... 370/392
See application file for complete search history.

(56) References Cited

U.S. PATENT DOCUMENTS

| | | | | |
|---|---|---|---|---|
| 2011/0305176 A1* | 12/2011 | Wentink | ................ | H04L 1/1607 370/310 |
| 2013/0343275 A1* | 12/2013 | Merlin | .................. | H04L 1/0007 370/328 |
| 2015/0139002 A1* | 5/2015 | Lee | ........................ | H04W 24/08 370/252 |

(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

(Continued)

*Primary Examiner* — Peter Cheng
(74) *Attorney, Agent, or Firm* — Nicholson De Vos Webster & Elliott LLP

(57) ABSTRACT

A method implemented by a first network device in a Wireless Local Area Network (WLAN) to provide Modulation Coding Scheme (MCS) feedback. The method includes selecting an MCS that is determined to have a highest data rate among a plurality of available MCSes that when used to transmit a frame having a reference payload size over a wireless communications link between the first network device and a second network device results in a frame error rate that is less than or equal to a threshold error rate for a given set of transmission properties, generating a frame having a Media Access Control (MAC) header, wherein a control field of the MAC header includes an indication of the selected MCS, and transmitting the generated frame to the second network device through a wireless medium.

15 Claims, 11 Drawing Sheets

(56) References Cited

U.S. PATENT DOCUMENTS

2016/0212507 A1* 7/2016 Du .......................... H04Q 9/00

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

Noh, et al., IEEE 802.11-16/1193r1 Submission, "HE variant HT Control—HE Link Adaptation," Sep. 12, 2016, 3 pages.

\* cited by examiner

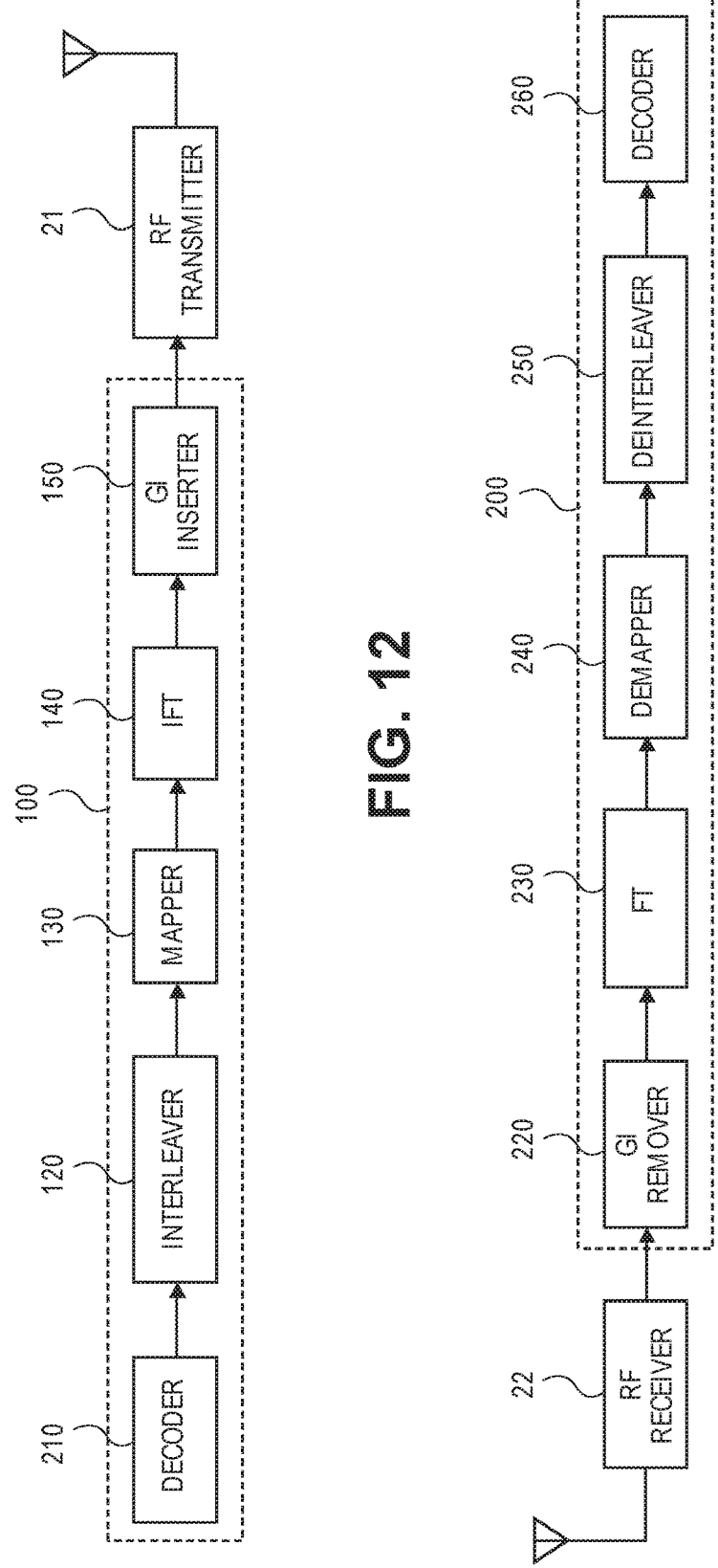

LINK ADAPTATION FOR 802.11 SYSTEM

CROSS-REFERENCE TO RELATED APPLICATIONS

This application claims the benefit of U.S. Provisional Application No. 62/236,802, filed Oct. 2, 2015 and U.S. Provisional Application No. 62/252,353, filed Nov. 6, 2015, which are hereby incorporated by reference.

FIELD OF INVENTION

The embodiments described herein related to the field of Wireless Local Area Network (WLAN) operation. More specifically, the embodiments described herein relate to link adaptation in a WLAN. Other embodiments are also disclosed.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called IEEE 802.11ax, High Efficiency WLAN (HEW) standardization is under discussion. The HEW aims at improving performance felt by users demanding high-capacity and high-rate services. The HEW may support uplink (UL) and downlink (DL) multi-user (MU) simultaneous transmissions, which includes Multi-User Multiple-Input Multiple-Output (MU-MIMO) and Orthogonal Frequency Division Multiple Access (OFDMA) transmissions.

Link adaptation is a technique for adapting parameters of a wireless communications link between a transmitting WLAN device and a receiving WLAN device based on measurements of the current link quality in order to maximize transmission rate. One technique by which link adaptation can be achieved is through a Modulation Coding Scheme (MCS) feedback procedure, where the receiving WLAN device provides feedback to the transmitting WLAN device regarding a recommended MCS that the transmitting STA may use when transmitting to the receiving STA. In IEEE 802.11 systems, MCS feedback may be provided as part of the MAC header of a frame. However, existing IEEE 802.11 systems do not provide an appropriate reference for the transmitting STA to properly interpret and utilize the MCS feedback.

SUMMARY

A method is implemented by a first network device in a Wireless Local Area Network (WLAN) to provide Modulation Coding Scheme (MCS) feedback. The method includes selecting an MCS that is determined to have a highest data rate among a plurality of available MCSes that when used to transmit a frame having a reference payload size over a wireless communications link between the first network device and a second network device results in a frame error rate that is less than or equal to a threshold error rate for a given set of transmission properties, generating a frame having a Media Access Control (MAC) header, wherein a control field of the MAC header includes an indication of the selected MCS, and transmitting the generated frame to the second network device through a wireless medium.

A first network device is configured to provide Modulation Coding Scheme (MCS) feedback in a Wireless Local Area Network (WLAN). The network device includes a Radio Frequency (RF) transceiver, a set of one or more processors, and a non-transitory machine-readable storage medium having stored therein an MCS feedback component. The MCS feedback component, when executed by the set of one or more processors, causes the network device to select an MCS that is determined to have a highest data rate among a plurality of available MCSes that when used to transmit a frame having a reference payload size over a wireless communications link between the first network device and a second network device results in a frame error rate that is less than or equal to a threshold error rate for a given set of transmission properties, generate a frame having a Media Access Control (MAC) header, wherein a control field of the MAC header includes an indication of the selected MCS, and transmit the generated frame to the second network device through a wireless medium.

A non-transitory machine-readable medium has computer code stored therein, which when executed by a set of one or more processors of a first network device in a Wireless Local Area Network (WLAN), causes the first network device to perform operations for providing Modulation Coding Scheme (MCS) feedback. The operations include selecting an MCS that is determined to have a highest data rate among a plurality of available MCSes that when used to transmit a frame having a reference payload size over a wireless communications link between the first network device and a second network device results in a frame error rate that is less than or equal to a threshold error rate for a given set of transmission properties, generating a frame having a Media Access Control (MAC) header, wherein a control field of the MAC header includes an indication of the selected MCS, and transmitting the generated frame to the second network device through a wireless medium.

BRIEF DESCRIPTION OF THE DRAWINGS

Embodiments are illustrated by way of example, and not by way of limitation, in the figures of the accompanying drawings in which like references indicate similar elements. It should be noted that different references to "an" or "one"

embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 12 is a schematic block diagram exemplifying a transmitting signal processor in a WLAN device, according to some embodiments.

FIG. 13 is a schematic block diagram exemplifying a receiving signal processing unit in a WLAN device, according to some embodiments.

DETAILED DESCRIPTION

Figures 1, 2:
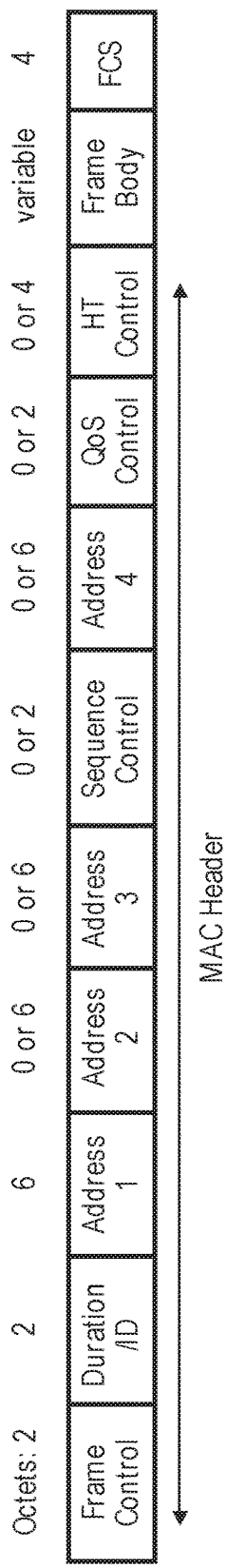
FIG. 1 is a diagram illustrating an exemplary MAC frame format, according to some embodiments.
FIG. 2 is a diagram illustrating exemplary HT Control field format for different variants, according to some embodiments.

The embodiments disclosed herein provide methods and apparatus for providing Modulation Coding Scheme (MCS) feedback in a Wireless Local Area Network (WLAN). An embodiment is a method implemented by a first network device in a WLAN that provide MCS feedback to a second network device in the WLAN. The method includes selecting an MCS that is determined to have a highest data rate among a plurality of available MCSes that when used to transmit a frame having a reference payload size over a wireless communications link between the first network device and the second network device results in a frame error rate that is less than or equal to a threshold error rate for a given set of transmission properties, generating a frame having a Media Access Control (MAC) header, where a control field of the MAC header includes an indication of the selected MCS, and transmitting the frame to the second network device through a wireless medium. Since the MCS is selected such that it is applicable for a reference payload size which is known to the second network device, the second network device may properly interpret and utilize the MCS feedback. Other embodiments are also described and claimed.

In the following description, numerous specific details are set forth. However, it is understood that embodiments described herein may be practiced without these specific details. In other instances, well-known circuits, structures and techniques have not been shown in detail in order not to obscure the understanding of this description. It will be appreciated, however, by one skilled in the art that the embodiments described herein may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a WLAN. STAs are devices connected to and communicating in a WLAN including client or user devices that connect to the WLAN via APs. APs are network devices that may be specialized wireless access points that can communicate with other network devices in the WLAN via the wireless medium or via wired connections. APs may be considered to be a type of STA. However, for ease of description, only non-AP STAs will be referred to herein as a STA. A non-AP STA or AP may be referred to herein as a WLAN device.

Link adaptation is a technique for adapting parameters of a wireless communications link between a transmitting WLAN device and a receiving WLAN device based on measurements of the current link quality in order to maximize transmission rate. One technique by which link adaptation can be achieved is through an MCS feedback procedure, where the receiving WLAN device provides feedback to the transmitting WLAN device regarding a recommended MCS that the transmitting STA may use when transmitting to the receiving WLAN device. The transmitting WLAN device may derive an MCS that it will use for transmissions to the receiving WLAN device based in part on the MCS recommended by the receiving WLAN device.

In Institute of Electrical and Electronics Engineers (IEEE) 802.11 systems, MCS feedback can be solicited or unsolicited. In solicited MCS feedback, the transmitting WLAN device requests MCS feedback from the receiving WLAN device. The transmitting WLAN device may request MCS feedback from the receiving WLAN device by transmitting a Physical Layer Protocol Data Unit (PPDU) to the receiving WLAN device that includes an indication that MCS feedback is requested. The receiving WLAN device may measure the current link quality of the wireless communications link based on the PPDU that includes the MCS feedback request and select a recommended MCS based on the measured link quality. The receiving WLAN device may then provide the recommended MCS to the transmitting WLAN device as part of MCS feedback. In unsolicited feedback, the receiving WLAN device autonomously provides MCS feedback to the transmitting WLAN device (without receiving a request from the transmitting WLAN device). That is, the receiving WLAN device provides MCS feedback to the transmitting WLAN device even though the transmitting WLAN device has not requested MCS feedback. The receiving WLAN device may measure the current link quality of the wireless communications link based on any PPDU received from the transmitting WLAN device and select a recommended MCS based on the measured link quality. The receiving WLAN device may then provide the recommended MCS to the transmitting WLAN device as part of MCS feedback. In unsolicited feedback, the receiving WLAN device may also convey some basic information regarding the PPDU that was used to measure the link quality to the transmitting WLAN device.

The optimal MCS for a particular transmission (e.g., the MCS that maximizes transmission rate for that particular transmission) depends on various properties of that particular transmission such as the coding scheme (e.g., data is encoded using binary convolutional codes (BCC) or low density parity check codes (LDPC)), the allocated resource unit size or bandwidth, the transmission scheme (e.g., single-user MIMO (SU-MIMO) or multi-user MIMO (MU-MIMO) or use of Space-time Block Codes (STBC) or Space-frequency Block Codes (SFBC)), the beamforming vector/matrix, the data packet size, and the number of spatial streams. The recommended MCS provided as part of MCS feedback may not be directly applicable for a particular transmission since transmission properties can vary from one transmission to another due to random traffic characteristics. In order for the transmitting WLAN device to properly interpret and utilize the MCS feedback, the transmitting WLAN device needs to know the transmission properties for which the MCS feedback applies (which is referred to herein as the reference for MCS feedback). However, existing IEEE 802.11 systems do not provide an appropriate reference for the transmitting WLAN device to properly interpret and utilize the MCS feedback.

Embodiments disclosed herein define a reference for MCS feedback that allows WLAN devices participating in an MCS feedback procedure to know the transmission properties for which the MCS feedback applies. With this reference, the transmitting WLAN device may adjust the MCS that it uses (from the recommended MCS provided as part of the MCS feedback) for its transmissions to account for the differences in transmission properties (compared to the transmission properties for which the MCS feedback applies), as needed.

In IEEE 802.11 systems, MCS feedback is typically provided in the MAC header, and more specifically, in an HT Control field of the MAC header. An exemplary MAC frame format and HT Control field format are described in additional detail below.

FIG. 1 is a diagram illustrating an exemplary MAC frame format, according to some embodiments. The MAC frame includes, among other fields, an HT Control field. The HT Control field may have a different field format depending on the variant of the HT Control field. For example, the HT Control field may have a different format depending on whether the HT Control field is a High Throughput (HT) variant HT Control field (e.g., for IEEE 802.11n), a Very High Throughput (VHT) variant HT Control field (e.g., for IEEE 802.11ac), or a High Efficiency (HE) variant HT Control field (e.g., for IEEE 802.11ax). The field format for the different variants are shown in FIG. 2. As shown in FIG. 2, the HT variant HT Control field includes a VHT subfield, an HT Control Middle subfield, an Access Category (AC) constraint subfield, and a Reverse Direction Grant (RDG)/More PPDU subfield. The value in the VHT subfield is set to 0 to indicate that this is an HT variant HT Control field. The VHT variant HT Control field includes a VHT subfield, an HE subfield, a VHT Control Middle subfield, an AC constraint subfield, and an RDG/more PPDU subfield. The values in the VHT subfield and the HE subfield is set to 1 and 0, respectively to indicate that this is a VHT variant HT Control field. The HE variant HT Control field includes a VHT subfield, an HE subfield, and an aggregated control subfield. The values in the VHT subfield and the HE subfield are both set to 1 to indicate that this is an HE variant HT Control field.

Figure 3:
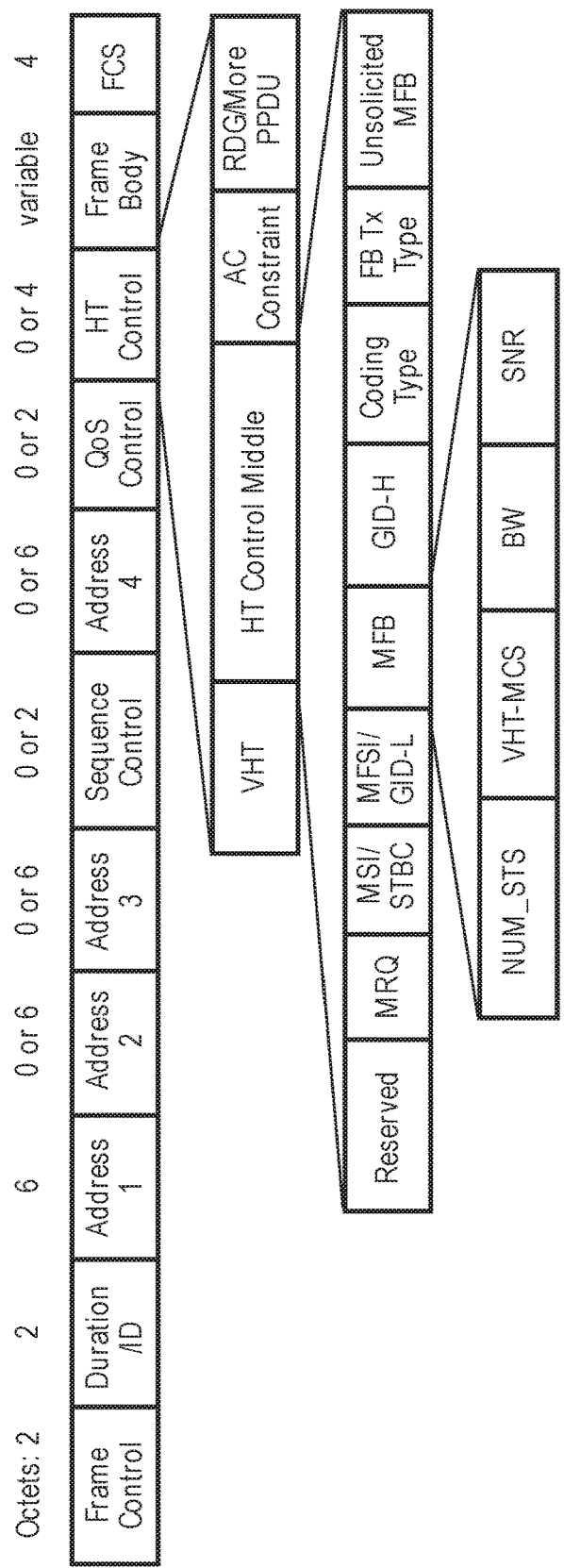
FIG. 3 is a diagram illustrating subfields of the HT Control field, according to some embodiments.

FIG. 3 is a diagram illustrating subfields of the HT Control field, according to some embodiments. For sake of illustration, a VHT variant HT Control field is shown and described. However, this should not be construed as limiting the techniques and principles described herein to a VHT context. It should be understood that the techniques and principles described herein are also applicable in other non-VHT contexts such as an HE context. As shown, the HT Control field of the MAC header includes, among other subfields, an HT Control Middle subfield. The HT Control Middle subfield includes, among other subfields, an MCS request (MRQ) subfield, an MRQ sequence identifier or Space-Time Block Coding (MSI/STBC) subfield, an MCS Feedback Sequence Identifier or least significant bits of group ID (MFSI/GID-L) subfield and an MCS feedback (MFB) subfield. The MRQ subfield is used to indicate whether MCS feedback is requested. For example, the value in the MRQ subfield may be set to 1 to indicate that MCS feedback is requested, and set to 0 to indicate otherwise. When MCS feedback is being requested, the MSI/STBC subfield is used to indicate a sequence number that identifies the MCS feedback request. When responding to an MCS feedback request, the MFSI/GID-L subfield is used to indicate a sequence number that matches the sequence number that identifies the MCS feedback request that prompted the MCS feedback. The MFB subfield is used to indicate MCS feedback. The MFB subfield includes, among other subfields, a VHT-MCS subfield (which may be referred to herein simply as the MCS subfield). The MCS subfield is used to indicate a recommended MCS. Further, the MCS feedback subfield includes a number of space-time stream (NUM_STS) subfield, a bandwidth (BW) subfield and a signal-to-noise ratio (SNR) subfield. The NUM_STS is used to indicate a recommended number of space-time stream, the BW subfield is used to indicate a bandwidth of the recommended MCS, and the SNR subfield is used to indicate an average SNR over data subcarriers and space-time streams.

Figure 4:
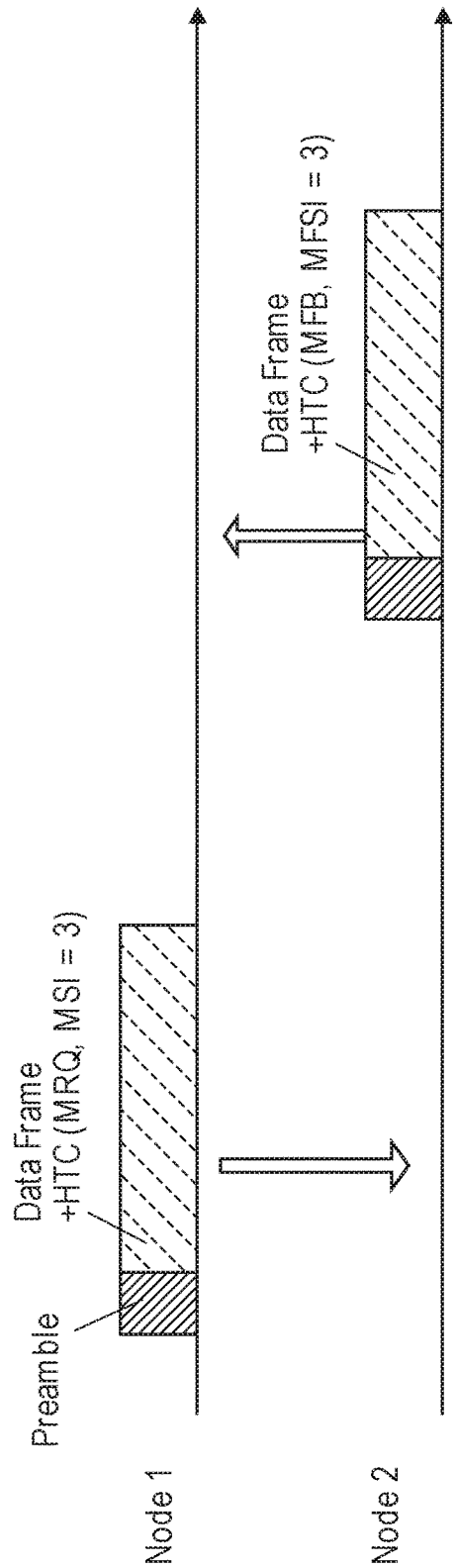
FIG. 4 is a diagram illustrating a solicited MCS feedback procedure, according to some embodiments.

FIG. 4 is a diagram illustrating a solicited MCS feedback procedure, according to some embodiments. As mentioned above, in a solicited MCS feedback procedure, a transmitting WLAN device requests MCS feedback from a receiving WLAN device. The diagram illustrates an exemplary solicited MCS feedback procedure, where node 1 is the transmitting WLAN device and node 2 is the receiving WLAN device. In the diagram, the x-dimension represents time. As shown in the diagram, node 1 initiates the MCS feedback procedure by transmitting a PPDU to node 2. This PPDU includes a preamble portion followed by a data frame. The HT Control field (HTC) of the MAC header of the data frame includes an indication that MCS feedback is requested (e.g., in the MRQ subfield) and an indication of a sequence number that identifies this MCS feedback request. In this example, the sequence number that identifies the MCS feedback request is 3 (MSI=3). Node 2 measures the link quality of the wireless communications link between node 1 and node 2 based on the PPDU that includes the MCS feedback request and selects a recommended MCS based on the measured link quality. Node 2 then transmits its own PPDU to node 1. This PPDU includes a preamble portion followed by a data frame. The HT Control field of the MAC header of the data frame includes an indication of MCS feedback (e.g., including an indication of the recommended MCS) (e.g., in the MFB subfield) and an indication of a sequence number that identifies the MCS feedback request that prompted the MCS feedback (e.g., in the MFSI subfield). In this example, the sequence number that identifies the MCS feedback request that prompted the MCS feedback is 3 (MFSI=3). In this way, node 1 solicits MCS feedback from node 2 and in response, node 2 provides MCS feedback to node 1. The node that requests MCS feedback (e.g., node 1) may be referred to as the MFB requestor and the node that provides MCS feedback may be referred to as the MFB responder (e.g., node 2).

In unsolicited MCS feedback, the receiving WLAN device autonomously provides MCS feedback to the transmitting WLAN device (e.g., without receiving an MCS feedback request from the transmitting WLAN device). The receiving WLAN device may also convey some basic information regarding the PPDU that was used to measure the link quality to the transmitting WLAN device.

The recommended MCS that is provided as part of MCS feedback may be selected based on the transmission properties of the PPDU that the receiving WLAN device uses to measure the link quality. In the solicited MCS feedback case, this PPDU is typically the PPDU that includes the MCS feedback request. In the unsolicited MCS feedback case, this PPDU is typically a PPDU chosen by the receiving WLAN device. The transmission properties of the PPDU may include the coding scheme, the allocated resource unit size, the number of spatial streams, the use of STBC/SFBC, and the use of Dual Carrier Modulation (DCM). For example, the receiving WLAN device may select the recommended MCS in a manner that optimizes transmission rate for the transmitting WLAN device based on transmission properties of the PPDU that is used to measure the link quality.

Figure 5:
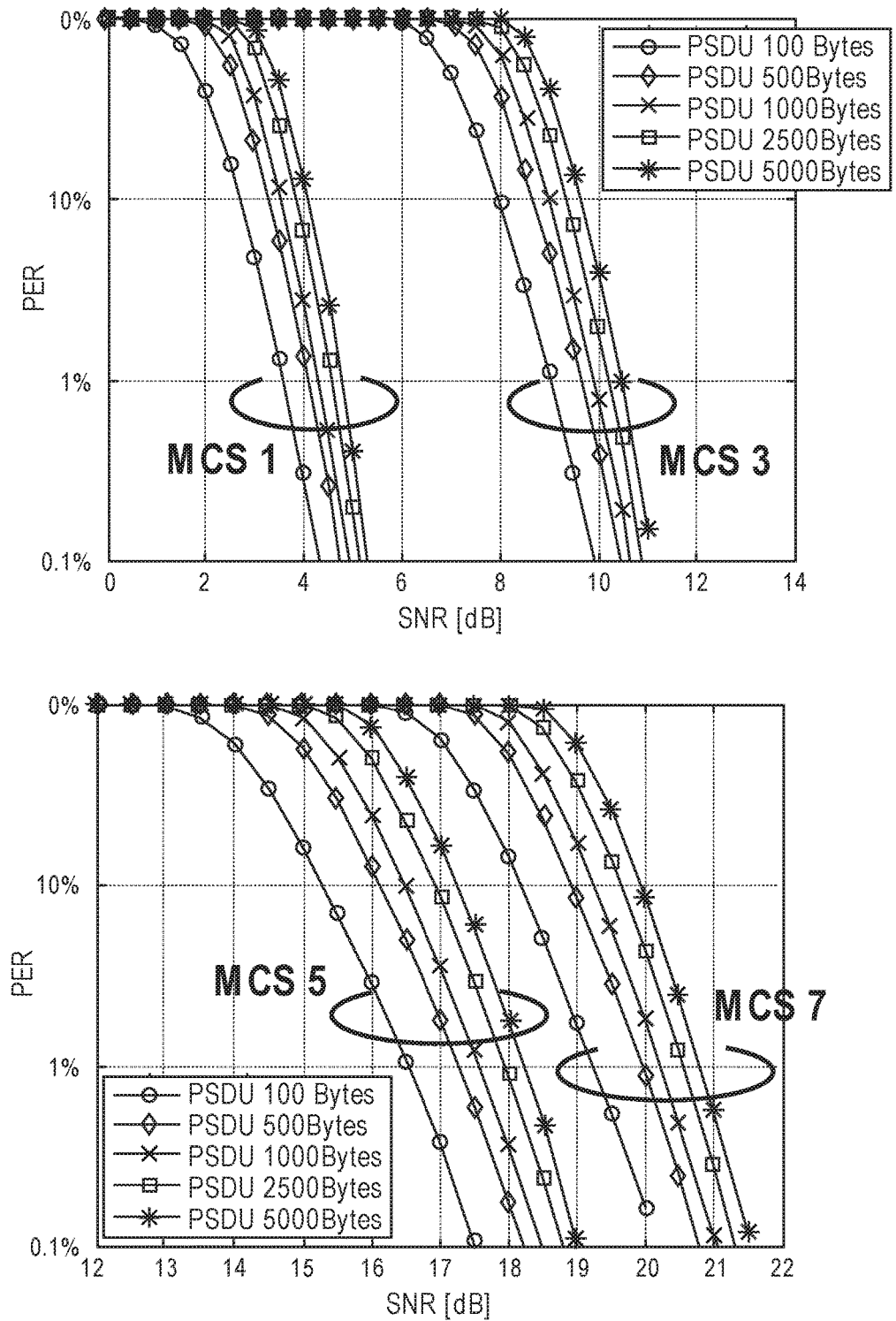
FIG. 5 is a graph illustrating how the required SNR for a given MCS can vary with payload size, according to some embodiments.

A recommended MCS that is received as part of MCS feedback may not be directly applicable for a particular transmission since transmission properties can vary from one transmission to another due to random traffic characteristics. One such transmission property that typically varies from one transmission to another is the payload size of the transmission. It has been observed that the required signal-to-noise ratio (SNR) for a given MCS varies significantly based on payload size. FIG. 5 is a graph illustrating how the required SNR for a given MCS can vary with payload size (e.g., PSDU length), according to some embodiments. The x-axis of the graph represents SNR and the y-axis of the graph represents packet error rate (PER). This means that when a transmitting WLAN device receives MCS feedback, the transmitting WLAN device may not be able to properly interpret and utilize this MCS feedback if the transmitting WLAN device does not know for which payload size the MCS feedback applies. For example, if a transmitting WLAN device receives MCS feedback that includes an indication of a recommended MCS without having a reference payload size for which the MCS feedback applies, the transmitting WLAN device has no way of knowing for which payload size the recommended MCS is applicable for and thus may blindly use the recommended MCS for transmissions having various different payload sizes, which may result in suboptimal performance.

Embodiments disclosed herein overcome some of the deficiencies of conventional MCS feedback techniques by introducing the concept of a reference payload size. According to some embodiments, the receiving WLAN device selects a recommended MCS that is applicable for a reference payload size. For example, the receiving WLAN device may select the MCS that optimizes the transmission rate for a transmission that has a payload size that is equivalent to the reference payload size, and provide this MCS as part of MCS feedback to the transmitting WLAN device. The transmitting WLAN device has knowledge of the reference payload size for which the recommended MCS applies, and thus the transmitting WLAN device may interpret and utilize the recommended MCS accordingly. For example, for transmissions that have the same or similar payload size as the reference payload size, the transmitting WLAN device may use the recommended MCS as is. However, for transmissions that have a different payload size from the reference payload size, the transmitting WLAN device may adjust the MCS that it uses for those transmissions (from the recommended MCS) to account for the differences in payload size compared to the reference payload size.

For example, in one embodiment (referred to herein as embodiment E1), the receiving WLAN device selects the recommended MCS to be the MCS having the highest data rate for a given resource unit size and number of spatial streams that will result in a Physical Layer Service Data Unit (PSDU) error rate of 10% or lower for a PSDU length of Npsdu octets. In this embodiment, the reference payload size is a PSDU length of Npsdu octets. In another embodiment (referred to herein as embodiment E2), the receiving WLAN device selects the recommended MCS to be the MCS having the highest data-rate for a given resource unit size and number of spatial streams that will result in a MAC Protocol Data Unit (MPDU) error rate of 10% or lower for an MPDU length of Nmpdu octets. In this embodiment, the reference payload size is an MPDU length of Nmpdu octets. In one embodiment, the other transmission properties (e.g., coding scheme (BCC or LDPC), transmit waveform (e.g., broadcast, SU-MIMO beamforming (BF), SU-MIMO STBC/SFBC, MU-MIMO BF) that are used to select the recommended MCS can be determined from the RXVECTOR of the PPDU that is used to measure the link quality.

Figure 6:
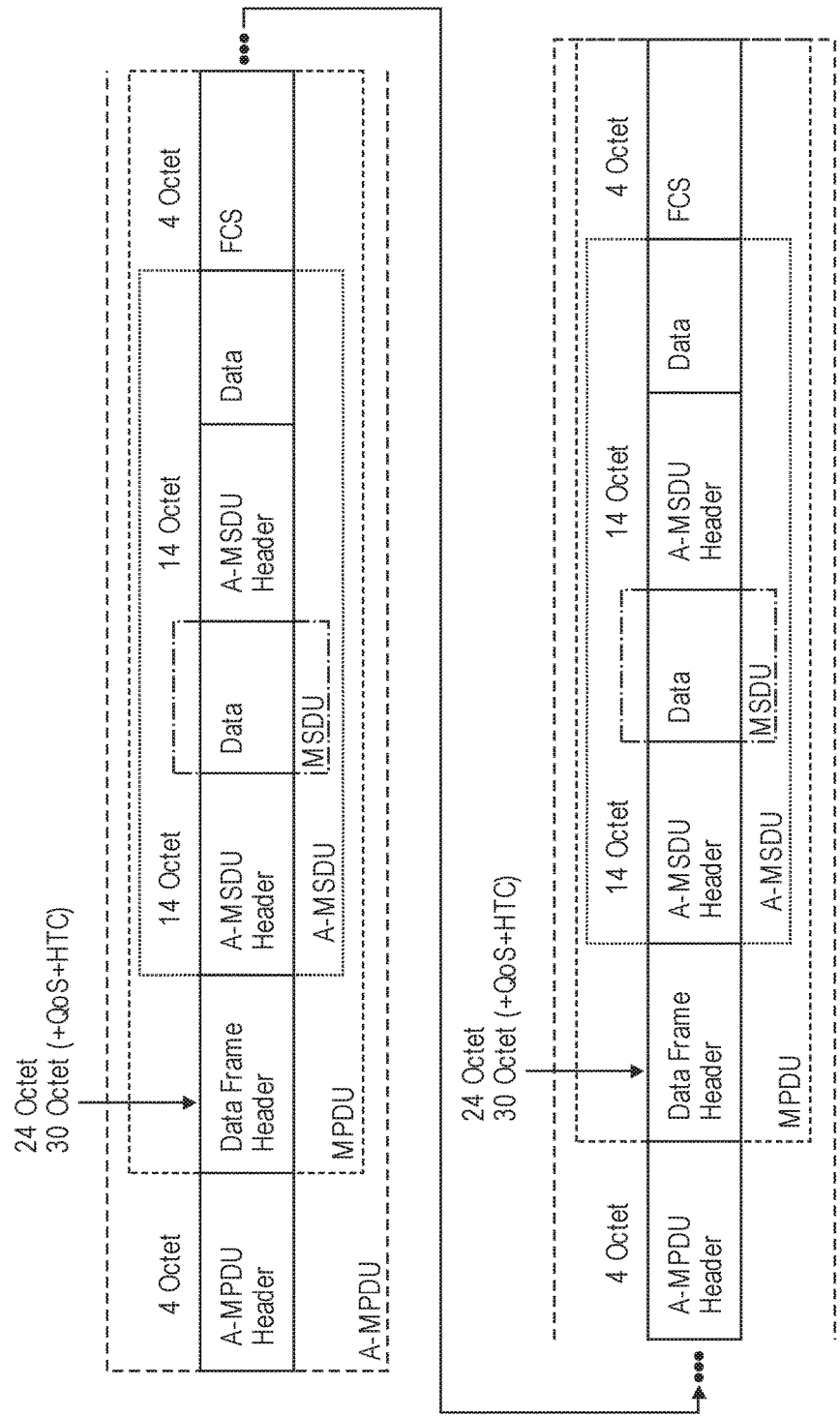
FIG. 6 is a diagram illustrating the relationships between A-MPDU, MPDU, A-MSDU, and MSDU, according to some embodiments.

In the above embodiments (e.g., embodiment E1 and E2) and other embodiments, PSDU refers to the payload that the MAC layer provides to the PHY layer and MPDU refers to one frame out of potentially many frames that are included in the payload that the MAC layer provides to the PHY layer. The final payload that the MAC layer provides to the PHY layer may be an aggregated MPDU (A-MPDU), which includes one or more MPDUs. A single MPDU may include an aggregated MAC Service Data Unit (A-MSDU), which includes one or more MAC Service Data Units (MSDUs). An MSDU is the basic unit of packets that are provided by upper layers (e.g., Internet Protocol (IP) layer). FIG. 6 is a diagram illustrating the relationships between A-MPDU, MPDU, A-MSDU, and MSDU, according to some embodiments.

It should be noted that with embodiment E1 mentioned above, the PSDU size may change with respect to modulation, coding rate, resource unit size, and number of spatial streams. This results in different required effective SNR of the wireless communications link to achieve a particular PSDU error rate. This may make embodiment E1 more complicated to implement than embodiment E2.

For embodiment E2, a possible value for Nmpdu is 3,895, which is the lowest maximum MPDU length supported in VHT transmissions. Different IEEE 802.11 variants (e.g., non-HT, HT, VHT, and HE) may define different maximum lengths that are allowed for MSDU, A-MSDU, MPDU, and PSDU (or A-MPDU). The maximum lengths for MSDU, A-MSDU, MPDU, and PSDU (or A-MPDU) for different variants are shown in Table I below.

TABLE I

|  | MSDU | A-MSDU | MPDU | PSDU |
|---|---|---|---|---|
| Non-HT | 2304 | 3839 or 4065 or 7935 | N/A | $2^{12}-1$ |
| HT | 2304 | 3839 or 7935 | N/A | $2^{16}-1$ |
| VHT | 2304 | N/A | 3,895 or 7,991 or 11,454 | 4,692,480 |

Figure 7:
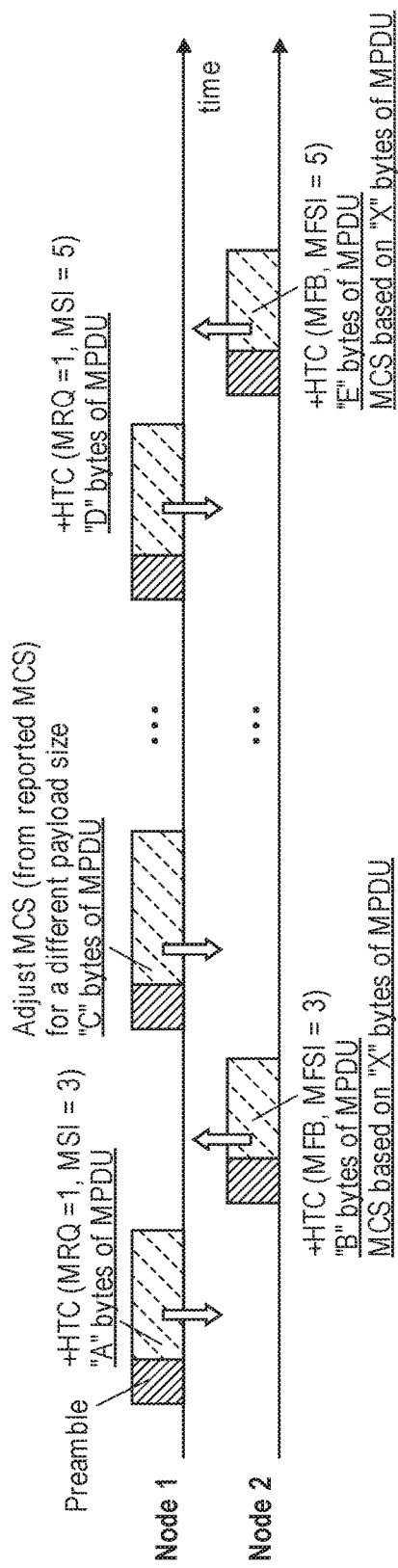
FIG. 7 is a diagram illustrating a solicited MCS feedback procedure that uses a fixed payload reference size, according to some embodiments.

FIG. 7 is a diagram illustrating a solicited MCS feedback procedure that uses a fixed payload reference size, according to some embodiments. In the diagram, the x-dimension represents time. In the exemplary solicited MCS feedback procedure shown in the diagram, node 1 is the transmitting WLAN device (or the MFB requestor) and node 2 is the receiving WLAN device (or the MFB responder). In this example, the reference payload size is predetermined to be X bytes of MPDU and this reference payload size is known to both node 1 and node 2. As shown in the diagram, node 1 initiates the MCS feedback procedure by transmitting a PPDU to node 2, where the PPDU includes an MPDU that is A bytes in length. The HT Control field (HTC) of the MAC header of the MPDU includes an indication that MCS feedback is requested (e.g., MRQ=1) and an indication of a sequence number that identifies this MCS feedback request (e.g., MSI=3 in this example). Node 2 measures the link quality of the wireless communications link between node 1 and node 2 based on the PPDU that includes the MCS feedback request and selects a recommended MCS that is applicable for the fixed reference payload size of X bytes of MPDU. Node 2 then transmits its own PPDU to node 1, where the PPDU includes an MPDU that is B bytes in length. The HT Control field of the MAC header of the MPDU includes an indication of MCS feedback, including an indication of the recommended MCS (e.g., in the MFB subfield), and an indication of a sequence number that matches the sequence number of the MCS feedback request that prompted the MCS feedback (e.g., MFSI=3 in this example). Node 1 may subsequently transmit another PPDU to node 2, where this PPDU includes an MPDU that is C bytes in length. For this transmission, node 1 may adjust the MCS that it uses (from the recommended MCS) so that it is applicable for the payload size of the transmission (e.g., C bytes of MPDU). Node 1 may subsequently initiate another MCS feedback procedure by transmitting yet another PPDU to node 2, where this PPDU includes an MPDU that is D bytes in length. The HT Control field of the MAC header of the MPDU includes an indication that MCS feedback is requested and an indication of a sequence number that identifies this MCS feedback request (e.g., MSI=5 in this example). Similar to the operations described above, node 2 selects a recommended MCS that is applicable for the fixed reference payload size of X bytes of MPDU. Node 2 then transmits its own PPDU back to node 1, where the PPDU includes an MPDU that is E bytes in length. The HT Control field of the MAC header of the MPDU includes an indication of MCS feedback, including an indication of the recommended MCS (e.g., in the MFB subfield), and an indication of a sequence number that matches the sequence number of the MCS feedback request that prompted the MCS feedback (e.g., MFSI=5 in this example). In this way, node 2 selects a recommended MCS such that it is applicable for a fixed reference payload size. Node 1 knows this fixed reference payload size and can thus adjust the MCS it uses (from the recommended MCS) for different transmissions according to the payload sizes of those transmissions.

Figure 8:
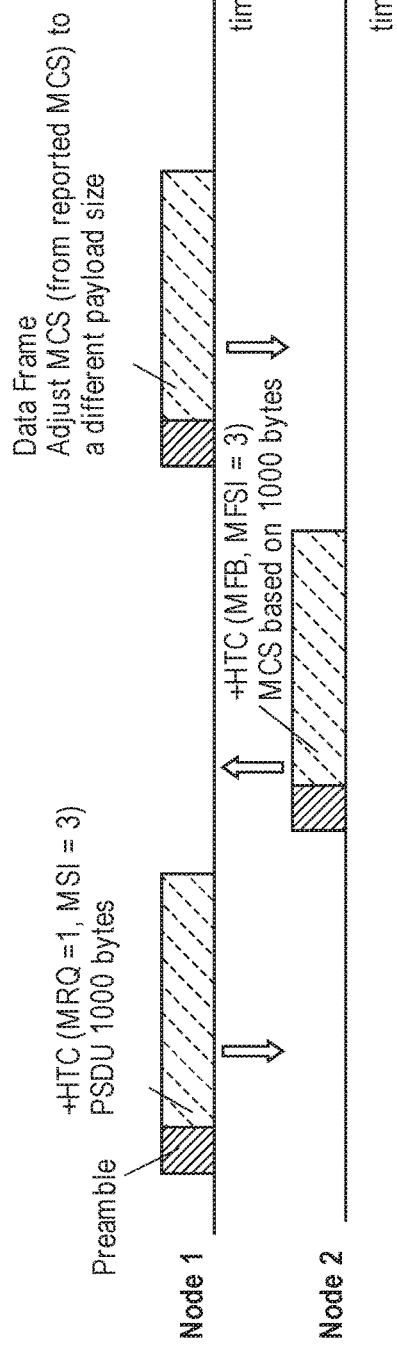
FIG. 8 is a diagram illustrating a solicited MCS feedback procedure that uses a reference payload size that is determined based on the payload size of the PPDU that includes the MCS feedback request, according to some embodiments.

FIG. 8 is a diagram illustrating a solicited MCS feedback procedure that uses a reference payload size that is determined based on the payload size of the PPDU that includes the MCS feedback request, according to some embodiments. In the diagram, the x-dimension represents time. In the exemplary solicited MCS feedback procedure shown in the diagram, node 1 is the transmitting WLAN device (or the MFB requestor) and node 2 is the receiving WLAN device (or the MFB responder). As shown in the diagram, node 1 initiates the MCS feedback procedure by transmitting a PPDU to node 2, where the PPDU includes a PSDU that is 1000 bytes in length. The PSDU includes an indication that MCS feedback is requested (e.g., MRQ=1 in HT Control field (HTC) of MAC header of an MPDU included in the PSDU) and an indication of a sequence number that identifies this MCS feedback request (e.g., MSI=3 in this example). Node 2 measures the link quality of the wireless communications link between node 1 and node 2 based on the PPDU that includes the MCS feedback request and selects a recommended MCS that is applicable for a reference payload size that matches the payload size of the PPDU that includes the MCS feedback request, which in this example is 1000 bytes. In one embodiment, the reference payload size can be the APEP_LENGTH of the PPDU (which is the total MAC payload excluding end-of-frame (EOF) padding), the length of the PSDU (which is the total MAC payload including all MAC padding), or the length of the MPDU (e.g., a single MAC frame) that includes the MCS feedback request. Node 2 then transmits its own PPDU to node 1, where this PPDU includes a PSDU. The PSDU includes an indication of MCS feedback, including an indication of the recommended MCS (e.g., in the MFB subfield), and an indication of a sequence number that matches the sequence number of the MCS feedback request that prompted the MCS feedback (e.g., MFSI=3 in this example). Node 1 may subsequently transmit another PPDU to node 2, where this PPDU includes a PSDU that is not 1000 bytes in length. For this transmission, node 1 may adjust the MCS that it uses (from the recommended MCS) so that it is applicable for the payload size of the transmission. In this way, node 2 selects a recommended MCS such that is applicable for a reference payload size that is determined based on the payload size of the PPDU that includes the MCS feedback request.

In one embodiment, for unsolicited MCS feedback, the reference payload size can be based on the payload size of PPDU that the receiving WLAN device uses to measure the link quality (e.g., reference payload size can be the same as the payload size of the PPDU that is used to measure the link quality). The PPDU that the receiving WLAN device uses to measure the link quality may include a frame, and this frame may include an indication of a frame sequence number that identifies the frame. In one embodiment, this frame sequence number can be conveyed along with MCS feedback. The transmitting WLAN device can then use the frame sequence number to derive the reference payload size.

Figure 9:
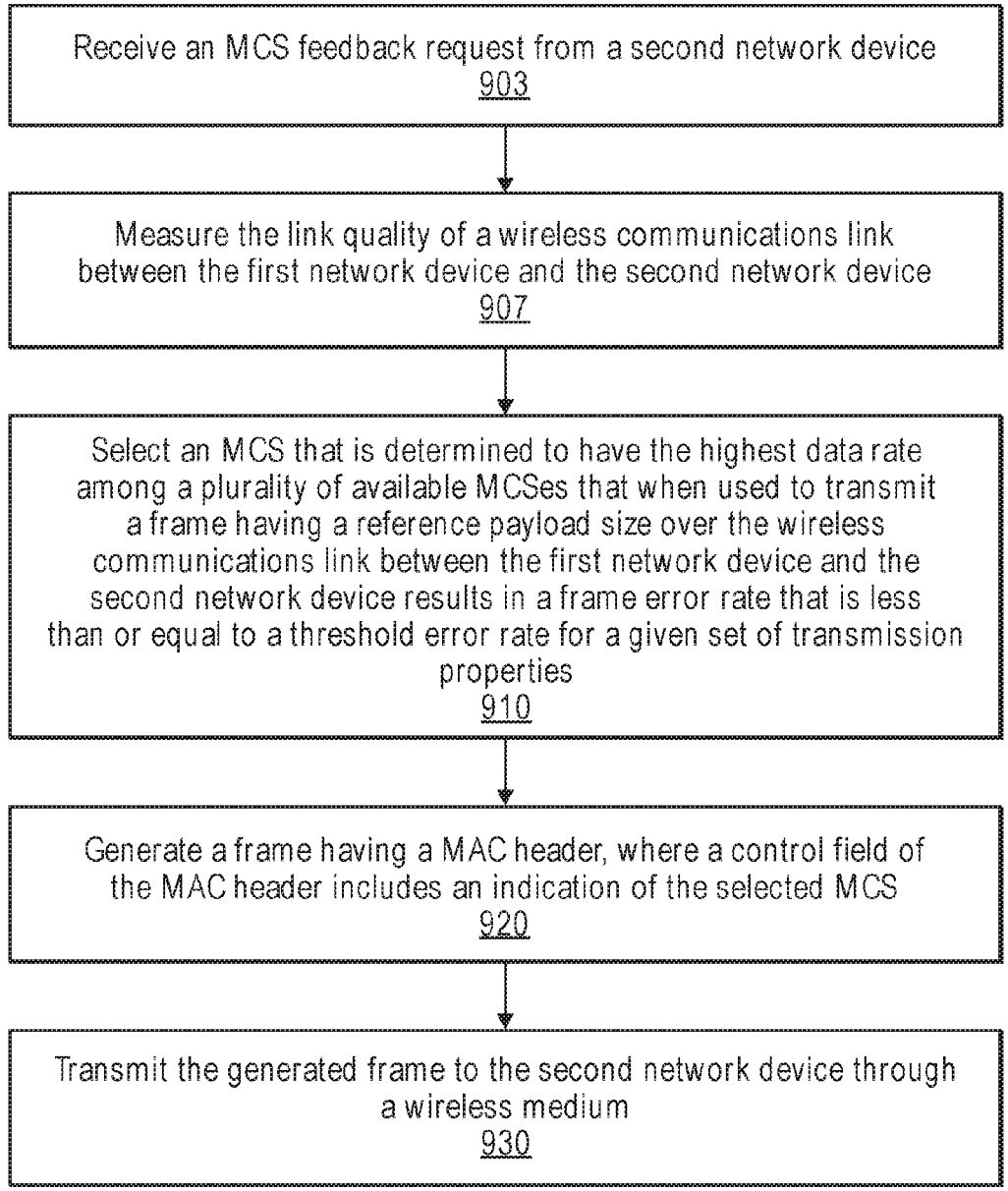
FIG. 9 is a flow diagram of a process for providing MCS feedback, according to some embodiments.

FIG. 9 is a flow diagram of a process for providing MCS feedback, according to some embodiments. In one embodiment, the process is implemented by a first network device in a WLAN (e.g., a WLAN device). The first network device may implement the process to provide MCS feedback to a second network device in the WLAN (e.g., a WLAN device), where the MCS feedback is applicable for a reference payload size. In the MCS feedback context, the first network device may be the receiving WLAN device and the second network device may be the transmitting WLAN device. The operations in this flow diagram and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In one embodiment, the process is initiated when the first network device receives an MCS feedback request from the second network device (e.g., a solicited MCS feedback case) (block 903). In another embodiment, the process is autonomously initiated by the first network device without receiving an MCS feedback request from the second network device (e.g., an unsolicited MCS feedback case).

In one embodiment, the first network device measures the link quality of a wireless communications link between the first network device and the second network device based on a PPDU received from the second network device (e.g., based on a preamble portion of the PPDU) (block 907). In a solicited MCS feedback case, the PPDU that is used to measure the link quality may be the PPDU that includes the MCS feedback request (e.g., PPDU that includes an indication that MCS feedback is requested). In an unsolicited MCS feedback case, the PPDU that is used to measure the link quality can be a PPDU chosen by the first network device.

The first network device selects an MCS that is determined to have the highest data rate among a plurality of available MCSes that when used to transmit a frame having a reference payload size over the wireless communications link between the first network device and the second network device (e.g., with the measured link quality) results in a frame error rate that is less than or equal to a threshold error rate for a given set of transmission properties (block 910). In one embodiment, the reference payload size is the lowest maximum MPDU length supported in a transmission. In one embodiment, the lowest maximum MPDU length supported in a transmission is 3895 octets (which is the lowest maximum MPDU length supported in VHT transmissions) in a solicited MCS feedback case or an unsolicited MCS feedback case. It should be understood that this reference payload size is provided by way of example and not limitation, and that other reference payload sizes can be used depending on implementation. In one embodiment, in a solicited MCS feedback case or an unsolicited MCS feedback case, the first network device determines the reference payload size based on the payload size of the PPDU received from the second network device that is used by the first network device to measure the link quality of the communications link between the first network device and the second network device. In a solicited MCS feedback case, this PPDU may be the PPDU that includes the MCS feedback request (PPDU that includes an indication that MCS feedback is requested). In one embodiment, in an unsolicited MCS feedback case where the first network device measures the link quality based on a PPDU chosen by the first network device and the first network device determines the reference payload size based on this chosen PPDU, the first network device inserts an indication of a frame sequence number of a frame included in the chosen PPDU in the MAC header of the generated frame. This information may allow the second network device to derive the reference payload size. In one embodiment, the threshold error rate is 10%. It should be understood that this error rate is provided by way of example and not limitation, and that other error rates can be used depending on implementation. In one embodiment, the given set of transmission properties can include a coding scheme, an allocated resource unit size, a number of spatial streams, beamforming vectors/matrices, use of STBC/SFBC, and/or use of DCM. In one embodiment, the given set of transmission properties are determined based on the transmission properties of the PPDU received from the second network device that is used by the first network device to estimate the link quality of the wireless communications link between the first network device and the second network device (e.g., obtained from the RXVECTOR of the PPDU).

The first network device then generates a frame having a MAC header, where a control field of the MAC header includes an indication of the selected MCS (block 920). In one embodiment, the control field is an HT Control field.

The first network device then transmits the generated frame to the second network device through a wireless medium (e.g., over the wireless communications link between the first network device and the second network device) (block 930). In this way, the first network device provides a recommended MCS to the second network device that is applicable for the reference payload size. The second network device may then adjust the MCS that it uses (from the recommended MCS) so that it is applicable for the payload size of its transmission.

Figure 10:
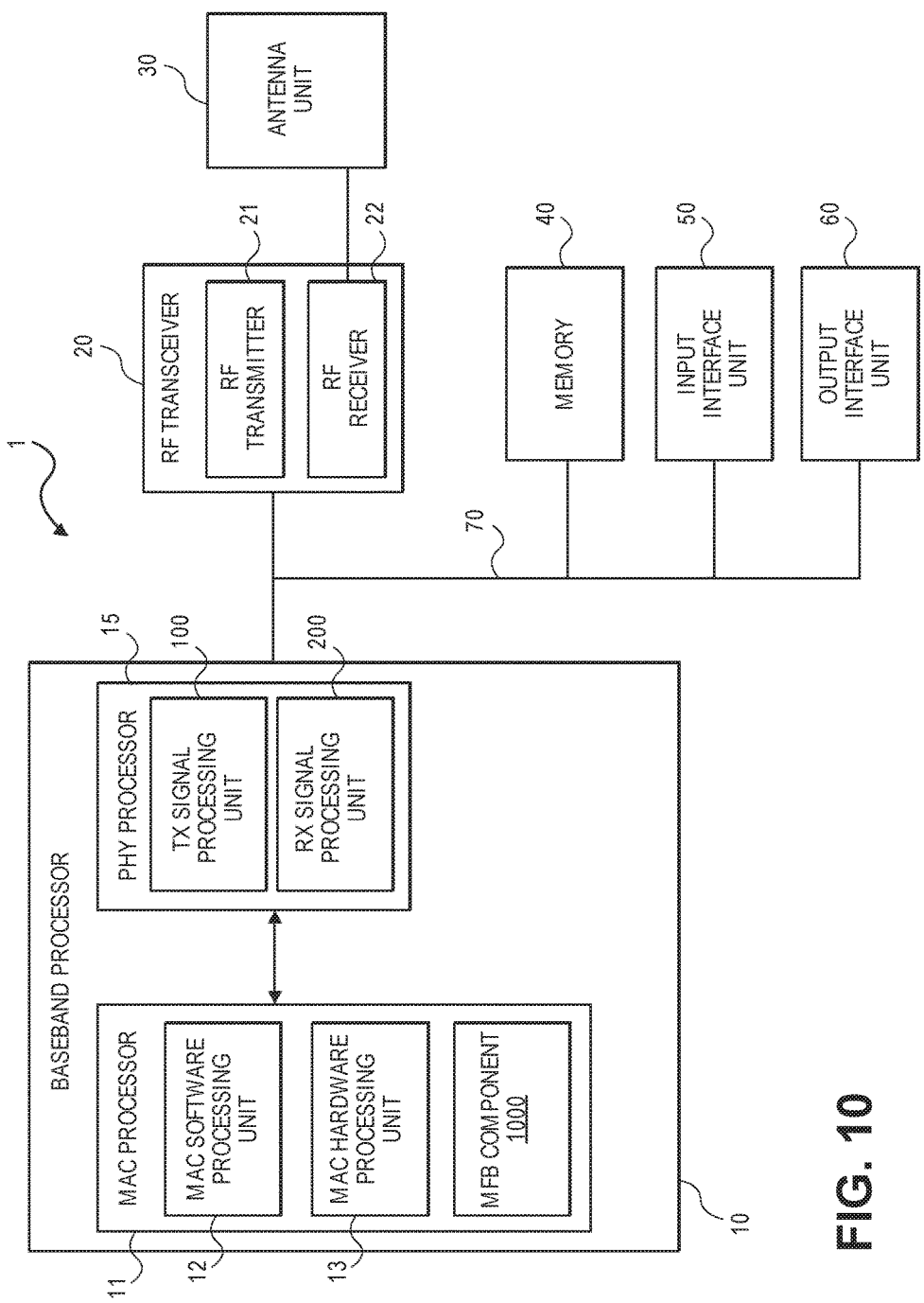
FIG. 10 is a block diagram of a network device implementing a STA or AP that executes an MCS feedback component, according to some embodiments.
Figure 11:
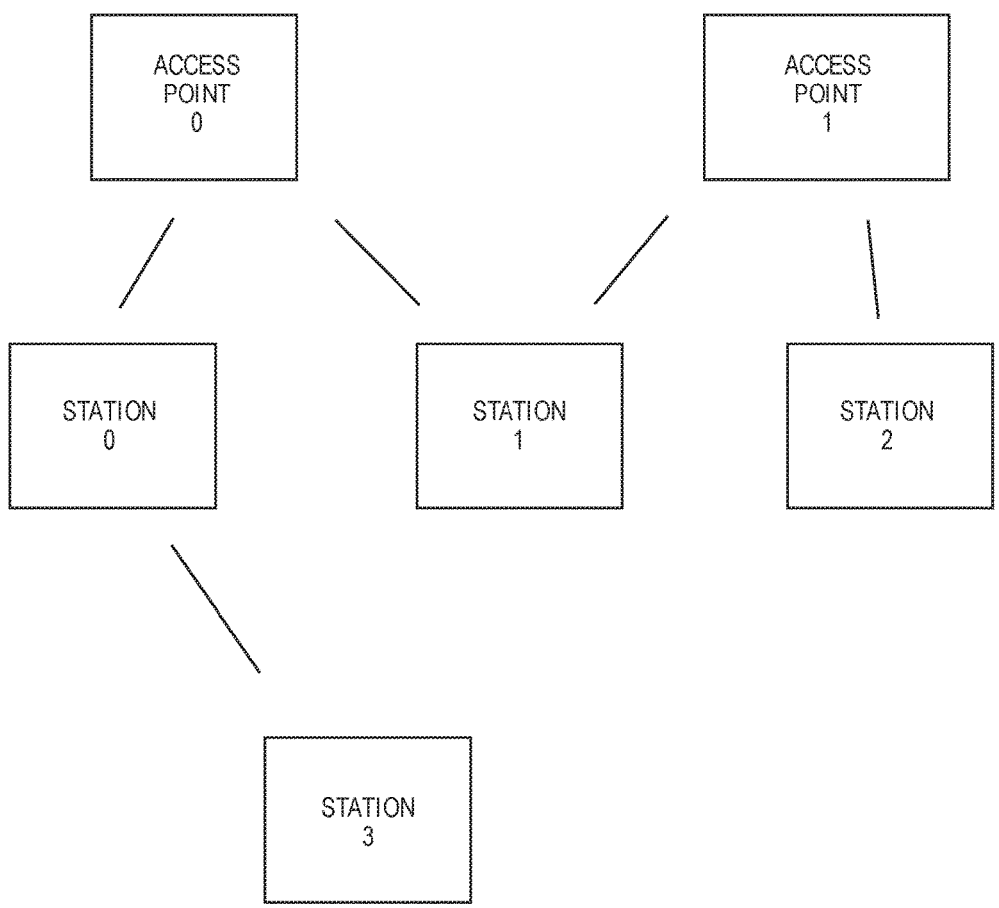
FIG. 11 is a block diagram of a WLAN, according to some embodiments.

FIG. 10 is a block diagram of a network device implementing a STA or AP that executes an MCS feedback component, according to some embodiments. In a WLAN such as the example WLAN illustrated in FIG. 11, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 11) and the other WLAN devices may be non-AP stations (non-AP STAs), (e.g., stations 0-3 in FIG. 11). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 11, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements an MCS feedback (MFB) component 800. The MFB component 800 can implement the respective functions for any combination of the embodiments described herein above with regard to FIGS. 1-7. In other embodiments, the MFB component 800 may be implemented by or distributed over both the PHY processor 15 and the MAC processor 11. The MFB component 800 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 9 and 10.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

FIG. 12 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input—multiple output (MIMO) or multiple user (MU)-MIMO is used, the transmitting signal processing unit 100 may use a plurality of interleavers 120 and a plurality of mappers 130 corresponding to the number Nss of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the Nss spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

FIG. 13 is a schematic block diagram exemplifying a receiving signal processing unit in the WLAN device, according to some embodiments. Referring to FIG. 13, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 14:
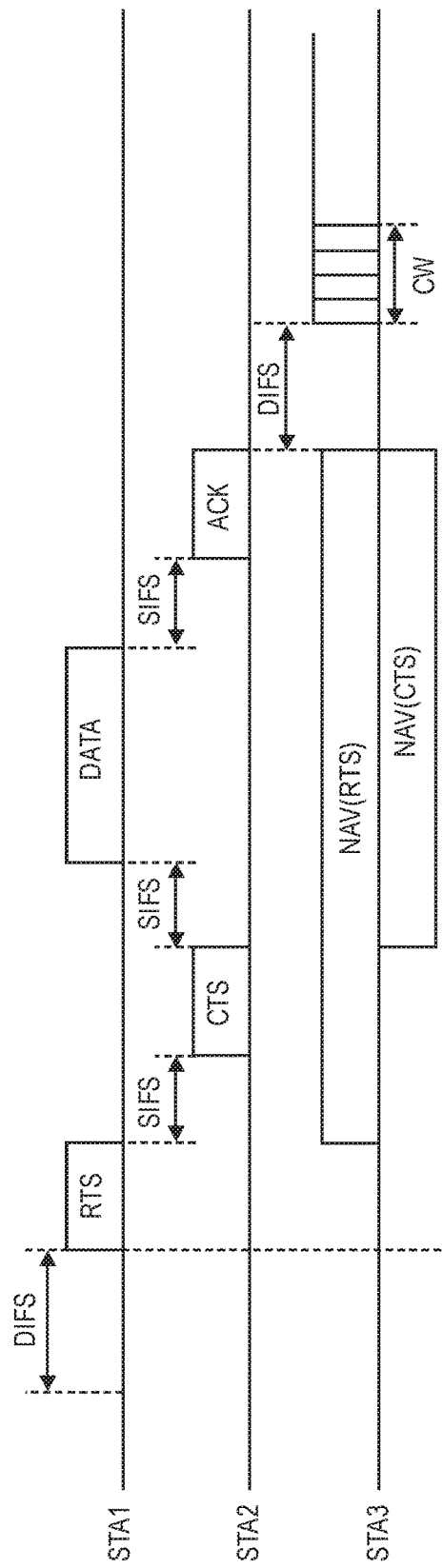
FIG. 14 is a timing diagram providing an example of the Carrier Sense Multiple Access/Collision Avoidance (CSMA/CA) transmission procedure, according to some embodiments.

FIG. 14 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a NAV timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+SIFS+ACK frame duration) by using duration information included in the CTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

A PHY-RXSTART.indication primitive is an indication by the physical layer (PHY) to the local MAC entity that the PHY has received a valid start of a PPDU, including a valid PHY header. This primitive is generated by the local PHY entity and provided to the MAC sublayer when the PHY has successfully validated a PHY header at the start of a new PPDU. This primitive provides the following parameters:

```
PHY-RXSTART.indication(
    RXVECTOR
)
```

The RXVECTOR parameter represents a list of parameters that the local PHY entity provides to the local MAC entity upon receipt of a valid PHY header or upon receipt of the last PSDU data bit in a received frame. The RXVECTOR may include a TXOP_DURATION parameter that includes duration information.

After generating a PHY-RXSTART.indication primitive, the PHY is expected to maintain a physical medium busy status during the period that it takes for the PHY to transfer a frame of the indicated LENGTH at the indicated DATARATE. The physical medium busy status may be maintained even if a PHY-RXEND.indication(CarrierLost)

primitive or a PHY-RXEND.indication(FormationViolation) primitive is generated by the PHY prior to the end of this period.

A PHY-RXEND.indication primitive is an indication by the PHY to the local MAC entity that the PSDU currently being received is complete. This primitive is generated by the local PHY entity and provided to the MAC sublayer to indicate that the receive state machine has completed a reception with or without errors. This primitive provides the following parameters:

PHY-RXEND.indication(
RXERROR,
RXVECTOR
)

The RXERROR parameter can convey one or more of the following values: NoError, FormatViolation, CarrierLost, Unsupported Rate and Filtered. A number of error conditions may occur after the PHY's receive state machine has detected what appears to be a valid preamble and Start Frame Delimiter (SFD). NoError is a value used to indicate that no error occurred during the receive process in the PHY. FormatViolation is a value used to indicate that the format of the received PPDU was in error. CarrierLost is a value used to indicate that the carrier was lost during the reception of the incoming PSDU and no further processing of the PSDU can be accomplished. UnsupportedRate is a value that is used to indicate that a non-supported data rate was detected during the reception of the incoming PPDU. Filtered is a value used to indicate that the incoming PPDU was filtered out during the reception of the incoming PPDU due to a condition set in the PHYCONFIG_VECTOR. In the case of an RXERROR value of NoError, the MAC may use the PHY-RXEND.indication primitive as a reference for channel access timing.

The RXVECTOR parameter represents a list of parameters that the local PHY entity provides to the local MAC entity upon receipt of a valid PHY header or upon receipt of the last PSDU data bit in a received frame. The RXVECTOR may include an RU_ALLOCATION parameter, a DCM parameter, a NUM_STS parameter, an FEC_CODING parameter, a BEAMFORMED parameter, a BEAM_CHANGE parameter, and an STBC parameter. RXVECTOR may only be included when dot11RadioMeasurementActivated is true. This vector may contain both MAC and MAC management parameters.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a first network device in a Wireless Local Area Network (WLAN) to provide Modulation Coding Scheme (MCS) feedback, the method comprising:
    determining a reference payload size based on a payload size of a Physical Layer Protocol Data Unit (PPDU) received from a second network device that is used by the first network device to measure a link quality of a wireless communications link between the first network device and the second network device;
    selecting an MCS that is determined to have a highest data rate among a plurality of available MCSes that when used to transmit a frame having the reference payload size over the wireless communications link between the first network device and the second network device results in a frame error rate that is less than or equal to a threshold error rate for a given set of transmission properties, wherein the given set of transmission properties include any one of a coding scheme, an allocated frequency resource unit size, a number of spatial streams, beamforming vectors/matrices, use of Space-time Block Codes (STBC) or Space-frequency Block Codes (SFBC), and use of Dual Carrier Modulation (DCM);
    generating a frame having a Media Access Control (MAC) header, wherein a control field of the MAC header includes an indication of the selected MCS; and
    transmitting the generated frame to the second network device through a wireless medium.

2. The method of claim 1, wherein the threshold error rate is 10%.

3. The method of claim 1, wherein the given set of transmission properties are determined based on one or more transmission properties of the PPDU received from the second network device that is used by the first network device to measure the link quality of the wireless communications link between the first network device and the second network device.

4. The method of claim 3, wherein the PPDU received from the second network device includes an indication that MCS feedback is requested.

5. The method of claim 1, wherein the MAC header of the generated frame includes an indication of a frame sequence number of a frame included in the PPDU received from the second network device that is used by the first network device to measure the link quality of the wireless communications link between the first network device and the second network device.

6. A first network device configured to provide Modulation Coding Scheme (MCS) feedback in a Wireless Local Area Network (WLAN), the first network device comprising:
 a Radio Frequency (RF) transceiver;
 a set of one or more processors; and
 a non-transitory machine-readable medium having stored therein an MCS feedback component, which when executed by the set of one or more processors, causes the first network device to determine a reference payload size based on a payload size of a Physical Layer Protocol Data Unit (PPDU) received from a second network device that is used by the first network device to measure a link quality of a wireless communications link between the first network device and the second network device, select an MCS that is determined to have a highest data rate among a plurality of available MCSes that when used to transmit a frame having the reference payload size over the wireless communications link between the first network device and the second network device results in a frame error rate that is less than or equal to a threshold error rate for a given set of transmission properties, wherein the given set of transmission properties include any one of a coding scheme, an allocated frequency resource unit size, a number of spatial streams, beamforming vectors/matrices, use of Space-time Block Codes (STBC) or Space-frequency Block Codes (SFBC), and use of Dual Carrier Modulation (DCM), generate a frame having a Media Access Control (MAC) header, wherein a control field of the MAC header includes an indication of the selected MCS, and transmit the generated frame to the second network device through a wireless medium.

7. The first network device of claim 6, wherein the threshold error rate is 10%.

8. The first network device of claim 6, wherein the given set of transmission properties are determined based on one or more transmission properties of the PPDU received from the second network device that is used by the first network device to measure the link quality of the wireless communications link between the first network device and the second network device.

9. The first network device of claim 8, wherein the PPDU received from the second network device includes an indication that MCS feedback is requested.

10. The first network device of claim 6, wherein the MAC header of the generated frame includes an indication of a frame sequence number of a frame included in the PPDU received from the second network device that is used by the first network device to measure the link quality of the wireless communications link between the first network device and the second network device.

11. A non-transitory machine-readable medium having computer code stored therein, which when executed by a set of one or more processors of a first network device in a Wireless Local Area Network (WLAN), causes the first network device to perform operations for providing Modulation Coding Scheme (MCS) feedback, the operations comprising:
 determining a reference payload size based on a payload size of a Physical Layer Protocol Data Unit (PPDU) received from a second network device that is used by the first network device to measure a link quality of a wireless communications link between the first network device and the second network device;
 selecting an MCS that is determined to have a highest data rate among a plurality of available MCSes that when used to transmit a frame having the reference payload size over the wireless communications link between the first network device and the second network device results in a frame error rate that is less than or equal to a threshold error rate for a given set of transmission properties, wherein the given set of transmission properties include any one of a coding scheme, an allocated frequency resource unit size, a number of spatial streams, beamforming vectors/matrices, use of Space-time Block Codes (STBC) or Space-frequency Block Codes (SFBC), and use of Dual Carrier Modulation (DCM);
 generating a frame having a Media Access Control (MAC) header, wherein a control field of the MAC header includes an indication of the selected MCS; and
 transmitting the generated frame to the second network device through a wireless medium.

12. The non-transitory machine-readable medium of claim 11, wherein the threshold error rate is 10%.

13. The non-transitory machine-readable medium of claim 11, wherein the given set of transmission properties are determined based on one or more transmission properties of the PPDU received from the second network device that is used by the first network device to measure the link quality of the wireless communications link between the first network device and the second network device.

14. The non-transitory machine-readable medium of claim 13, wherein the PPDU received from the second network device includes an indication that MCS feedback is requested.

15. The non-transitory machine-readable medium of claim 11, wherein the MAC header of the generated frame includes an indication of a frame sequence number of a frame included in the PPDU received from the second network device that is used by the first network device to measure the link quality of the wireless communications link between the first network device and the second network device.

* * * * *